(12) United States Patent
Onishi et al.

(10) Patent No.: US 11,066,956 B2
(45) Date of Patent: Jul. 20, 2021

(54) ON-OFF VALVE AND STEAM TURBINE

(71) Applicant: MITSUBISHI HITACHI POWER SYSTEMS, LTD., Yokohama (JP)

(72) Inventors: Tomoyuki Onishi, Tokyo (JP); Fumiyuki Suzuki, Yokohama (JP); Kensuke Futahashi, Tokyo (JP); Hao Li, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/480,419

(22) PCT Filed: Feb. 15, 2018

(86) PCT No.: PCT/JP2018/005324
§ 371 (c)(1),
(2) Date: Jul. 24, 2019

(87) PCT Pub. No.: WO2018/151231
PCT Pub. Date: Aug. 23, 2018

(65) Prior Publication Data
US 2019/0383169 A1 Dec. 19, 2019

(30) Foreign Application Priority Data
Feb. 15, 2017 (JP) .............................. JP2017-025964

(51) Int. Cl.
*F16K 27/02* (2006.01)
*F01D 25/24* (2006.01)
(Continued)

(52) U.S. Cl.
CPC ............. *F01D 25/24* (2013.01); *F01D 17/10* (2013.01); *F16K 27/102* (2013.01)

(58) Field of Classification Search
CPC .......... F16K 27/02; F16K 27/00; F01D 25/24; F01D 17/10
See application file for complete search history.

(56) References Cited

U.S. PATENT DOCUMENTS 4,481,776 A * 11/1984 Araki et al. .......... F01D 17/145
    137/614.19
6,070,605 A   6/2000 Steenburgh
(Continued)

FOREIGN PATENT DOCUMENTS

JP    S58-137670 A    8/1983
JP    2002-535544 A   10/2002
(Continued)

OTHER PUBLICATIONS

International Search Report dated Apr. 3, 2018, issued in counterpart application No. PCT/JP2018/005324, with English translation. (4 pages).
(Continued)

*Primary Examiner* — Kevin L Lee
(74) *Attorney, Agent, or Firm* — Westerman, Hattori, Daniels & Adrian, LLP (57) ABSTRACT

An on-off valve of the present invention includes a valve box which includes an inlet flow path of steam and an outlet flow path which communicates with the inlet flow path through a communication bole, a stop valve body which opens or closes the communication hole, and a stop valve support portion, in which the outlet flow path extends in a direction intersecting the opening direction of the communication hole toward a downstream side in a flow direction of the steam, and a minimum wall thickness of the valve box is smaller than a minimum wall thickness of the valve box.

8 Claims, 7 Drawing Sheets

(51) Int. Cl.
*F01D 17/10* (2006.01)
*F16K 27/10* (2006.01)

(56) References Cited

U.S. PATENT DOCUMENTS

| | | | | |
|---|---|---|---|---|
| 6,655,409 B1* | 12/2003 | Steenburgh et al. | ...... | F16K 1/08 |
| | | | | 137/614.19 |
| 8,020,383 B2* | 9/2011 | Ooishi et al. | ............ | F16K 1/42 |
| | | | | 60/670 |
| 2012/0073293 A1 | 3/2012 | Welch et al. | | |

FOREIGN PATENT DOCUMENTS

| | | |
|---|---|---|
| JP | 2004-028195 A | 1/2004 |
| JP | 2009-162177 A | 7/2009 |
| JP | 4619958 B2 | 1/2011 |
| JP | 2013-189864 A | 9/2013 |
| JP | 2014-152827 A | 8/2014 |
| JP | 2015-68309 A | 4/2015 |
| JP | 2016-31044 A | 3/2016 |
| WO | 2016/084530 A1 | 6/2016 |

OTHER PUBLICATIONS

Written Opinion dated Apr. 3, 2018, issued in counterpart application No. PCT/JP2018/005324, with English translation. (10 pages).

* cited by examiner

ON-OFF VALVE AND STEAM TURBINE

TECHNICAL FIELD

The present invention relates to an on-off valve provided in a steam flow path of a steam turbine.

Priority is claimed on Japanese Patent Application No. 2017-025964, filed on Feb. 15, 2017, the content of which is incorporated herein by reference.

BACKGROUND ART

In a steam turbine, moving blades and stationary blades are alternately arranged in a casing. A plurality of moving blades are provided on an outer peripheral surface of a rotary shaft rotating around an axis at interval in a circumferential direction of the rotary shaft. In addition, the stationary blades are fixed to the casing. In addition, main steam is supplied from a boiler into the casing to rotate the rotary shaft, and thus, for example, power is generated by a generator.

In the steam turbine, for example, an on-off valve is provided in a flow path through which the main steam is supplied from the boiler. Such an on-off valve is disclosed in PTL 1. In the on-off valve disclosed in PTL 1, a support shaft of a valve body is supported by a valve box at an inlet portion of the steam.

CITATION LIST

Patent Literature

[PTL1] Japanese Unexamined Patent Application, First Publication No. 2015-68309

SUMMARY OF INVENTION

Technical Problem

However, in the on-off valve disclosed in PTL1, a flow path of the inlet portion and a flow path of an outlet portion of the steam are disposed to be perpendicular to each other, and the support shaft supporting the valve body is, provided to penetrate the valve box. That is, a direction of the flow path is changed in the valve box, and the support shaft is provided at a position where the direction is changed. Accordingly, a flow of the steam stagnates at this position, and thus there is a concern that heat transfer between a wall surface of the valve box and the steam decreases at the position of the stagnation. As a result, in the valve box, a position of a portion which is heated by steam and has a high temperature and a position of a portion to which heat is not sufficiently transferred by the steam and which has a low temperature occur. In addition, at the position having a relatively low temperature, a temperature gradient of the wall surface of the valve box increases, and thus, thermal deformation of the valve box becomes uneven. As a result, the support shaft may be bent due to the uneven deformation of the valve box, and thus, there is a possibility that the valve body is not correctly opened and closed.

Therefore, the present invention provides an on-off valve and a steam turbine capable of smoothly opening and closing the valve body by suppressing the uneven thermal deformation of the valve box.

Solution to Problem

The present invention adopts the following means in order to solve the above-described problems.

According to a first aspect of the present invention, there is provided an on-off valve including: a valve box which includes an inlet flow path of steam, and an outlet flow path which communicates with the inlet flow path through a communication hole on a downstream side in a flow direction of the steam; a valve body which is configured to open or close the communication hole; and a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole, in which the outlet flow path extends in a direction intersecting the opening direction of the communication hole toward a downstream side, and a minimum wall thickness of the valve box on a side, which is positioned on a downstream side from the communication hole and is opposite to a side to which the outlet flow path extends across the valve support portion, is smaller than a minimum wall thickness of the valve box on an upstream side from the communication hole.

According to this on-off valve, the minimum wall thickness of the valve box on the outlet flow side becoming the downstream side of the communication hole and the side opposite to the side to which the outlet flow path extends across the valve support portion is smaller than the minimum wall thickness of the valve box on the inlet flow path side positioned on the upstream side of the communication hole. As a result, the thickness of the valve box can decrease at a position at which a direction of a flow path in the outlet flow path is changed and a position at which the flow of the steam stagnates around the valve support portion. Accordingly, for example, particularly, when the steam turbine starts or the like, in a case where the temperature of the valve box is changed suddenly, a temperature gradient on the wall surface of the valve box can be promoted at the position at which the flow of the steam stagnates.

According to a second aspect of the present invention, in the on-off valve of the first aspect, in an inner surface of the valve box forming the outlet flow path, an uneven portion is provided on an inner surface around the valve support portion.

A heat transfer area at the position at which the flow of the steam stagnates is increased by the uneven portion, and thus, it is possible to disturb the flow of the steam. Therefore, the heat transfer at the position at which the uneven portion is provided can be promoted, and the temperature of the valve box at the position at which the steam stagnates around the valve support portion can be close to temperatures of other portions of the valve box. As a result, it is possible to further decrease the temperature gradient of the wall surface of the valve box at the position at which the steam stagnates.

According to a third aspect of the present invention, in the on-off valve of the first or second, aspect, the on-off valve further includes a metal member which is fixed to an outer surface of the valve box on the downstream side from the communication hole.

Heat from the wall surface of the valve box can flow into the metal member on the side, to which the outlet flow path extends, by this metal member. That is, the metal member can function as a heat storage unit. Accordingly, compared with the side (the side to which the outlet flow path extends) on which the flow of the steam stagnates in the vicinity of the valve support portion, heat dissipation can be promoted on the side to which the outlet flow path extends, and thus, thermal deformation of the valve box around the valve support portion can be uniformized.

According to a fourth aspect of the present invention, in the on-off valve of any one of the first to third aspects, the on-off valve further includes a drive unit which is fixed to the valve box on the downstream side from the communication hole and configured to drive the valve support portion, in which a gap is provided between the drive unit and the valve box on the side opposite to the side to which the outlet flow path extends across the valve support portion.

In this way, the gap is provided between the drive unit and the valve box on the side opposite to the side to which the outlet flow path extends across the valve support portion, and thus, at this position, it is possible to suppress heat dissipation caused by heat conduction from the valve box to the drive unit. In addition, the gap is not provided between the valve box and the drive unit on the side to which the outlet flow path extends, and thus, the heat dissipation from the valve box to the drive unit is easily performed. Accordingly, thermal deformation of the valve box around the valve support portion can be uniformized on both sides of the valve support portion.

In addition, according to a fifth aspect of the present invention, there is provided an on-off valve including: a valve box which includes inlet flow path of steam, and an outlet flow path which communicates with the inlet flow path through a communication hole on a downstream side in a flow direction of the steam; a valve body which is configured to open or close the communication hole; a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole; and a metal member which is fixed to an outer surface of the valve box on a downstream side from the communication hole, in which the outlet flow path extends in a direction intersecting the opening direction of the communication hole toward a downstream side.

Heat from the wall surface of the valve box can flow into the metal member on the side, to which the outlet flow path extends, by the metal member, and thus, the metal member can function as a heat storage unit. Accordingly, compared with the side on which the flow of the steam stagnates in the vicinity of the valve support portion, heat dissipation can be promoted on the side to which the outlet flow path extends, and thus, thermal deformation of the valve box around the valve support portion can be uniformized.

In addition, according to a sixth aspect of the present invention, there is provided an on-off valve including: a valve box which includes an inlet flow path of steam, and an outlet flow path which communicates with the inlet flow path through a communication hole on a downstream side in a flow direction of the steam a valve body which is configured to open or close the communication hole; a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole; and a drive unit which is fixed to the valve box on a downstream side from the communication hole and configured to drive the valve support portion, in which the outlet flow path extends in a direction intersecting the opening direction of the communication hole toward a downstream side, and a gap is provided between the drive unit and the valve box on a side opposite to a side to which the outlet flow path extends across the valve support portion.

In this way, the gap is provided between the drive unit and the valve box on the side opposite to the side to which the outlet flow path extends across the valve support portion, and thus, at this position, it is possible to suppress heat dissipation caused by heat conduction from the valve box to the drive unit. In addition, the gap is not provided between the valve box and the drive unit on the side to which the outlet flow path extends, and thus, the heat dissipation from the valve box to the drive unit is easily performed. Accordingly, thermal deformation of the valve box around the valve support portion can be uniformized.

In addition, according to a seventh aspect of the present invention, there is provided an on-off valve including: a valve box which includes an inlet flow path of steam, and an outlet flow path which communicates with the inlet flow path through a communication hole on a downstream side in a flow direction of the steam; a valve body which is configured to open or close the communication hole; a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole; a metal member which is fixed to an outer surface of the valve box on a downstream side from the communication hole and on a side to which the outlet flow path extends across the valve support portion; and a drive unit which is fixed to the valve box on the downstream side from the communication hole and configured to drive the valve support portion, in which the outlet flow path extends in a direction intersecting the opening direction of the communication hole toward the downstream side, and a gap is provided between the drive unit and the valve box on a side opposite to a side to which the outlet flow path extends across the valve support portion.

Accordingly, thermal deformation of the valve box around the valve support portion can be uniformized by the metal member and the gap.

In addition, according to an eighth aspect of the present invention, there is provided a steam turbine including: a steam flow path; and the on-off valve according to any one of the first to seventh aspects provided in the steam flow path.

In the steam turbine, the on-off valve is provided, and thus, the minimum wall thickness of the valve box on the side opposite to the side to which the outlet flow path extends across the valve support portion on the outlet flow path side is smaller than the minimum wall thickness of the valve box on the inlet flow path side. As a result, the thickness of the valve box can decrease at a position at which a direction of, a steam flow path is changed and a position at which the flow of the steam stagnates around the valve support portion. Accordingly, when the steam turbine starts or the like, it is possible to decrease a temperature gradient on the wall surface of the valve box at the position at which the flow of the steam stagnates.

Advantageous Effects of Invention

According to the present invention, it is possible to smoothly open and close a valve body by suppressing uneven thermal deformation of a valve box.

DESCRIPTION OF EMBODIMENTS

First Embodiment

Hereinafter, embodiments of a steam turbine 10 according to the present invention will be described with reference to the accompanying drawings. However, the present invention is not limited to the embodiment.

Figure 1:
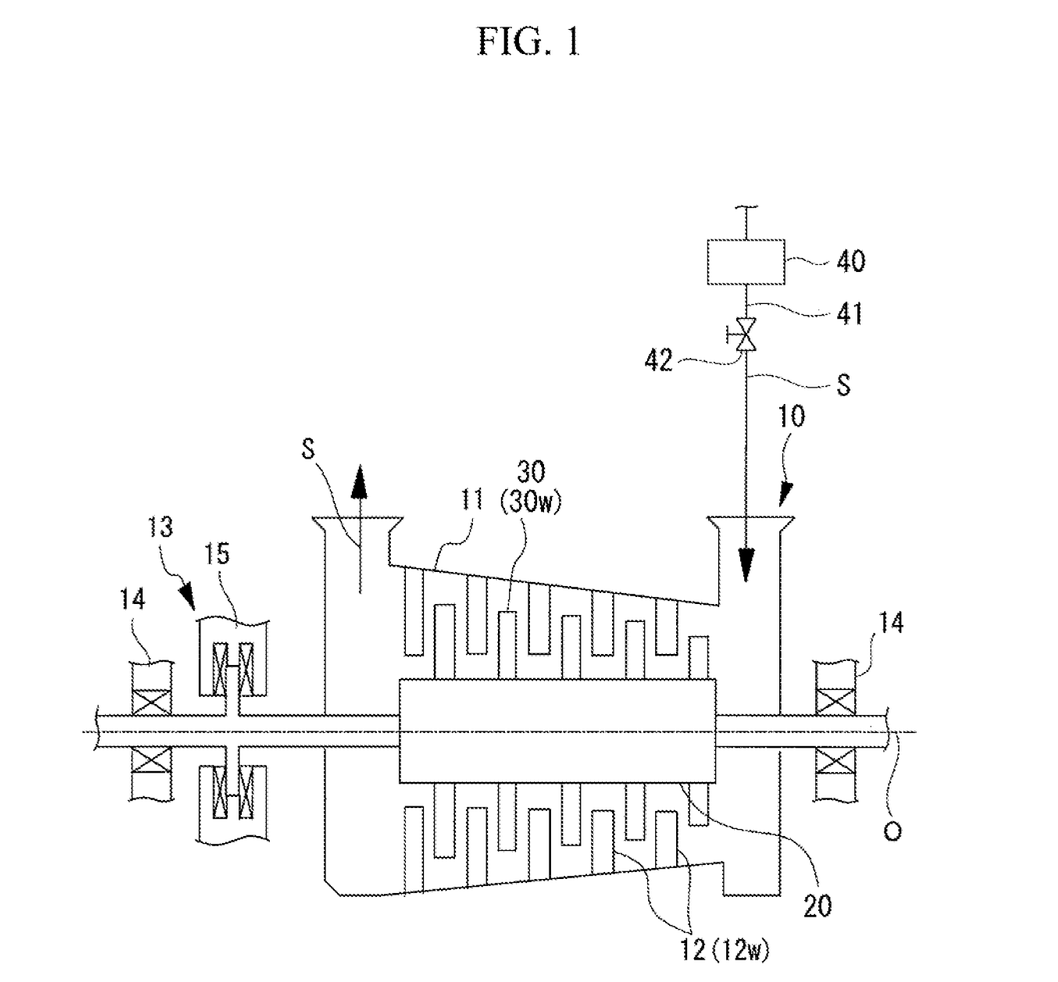
FIG. 1 is a schematic view showing an overall configuration of a steam turbine according to a first embodiment of the present invention.

As shown in FIG. 1, the steam turbine 10 of the present embodiment is an external combustion engine which extracts energy of steam S as rotational power and is used for a generator or the like in a power plant.

The steam turbine 10 includes a casing 11, a rotary shaft 20 which rotates with respect to the casing 11, a stationary blade ring 12 which is fixed to the casing 11 in the casing 11, a moving blade ring 30 which is fixed to the rotary shaft 20, a boiler 40 which generates steam S (main steam) to be supplied into the casing 11, a steam flow path 41 which connects the boiler 40 and the casing 11, and an on-off valve 42 which opens and closes the steam flow path 41.

The stationary blade ring 12 is held by the casing 11, and a plurality of stationary blade rings 12 are provided at intervals along a direction of a center axis O of the rotary shaft 20. Each stationary blade ring 12 is formed to expand radially inward from an inner peripheral surface of the casing 11. In each stationary blade ring 12, a plurality of stationary blades 12w are disposed at intervals in a circumferential direction.

The rotary shaft 20 extends along the center axis O to penetrate the casing 11. An intermediate portion of the rotary shaft 20 in the direction along the center axis O is accommodated in the casing 11, and both end portions of the rotary shaft 20 in the direction of the center axis O protrude toward an outside of the casing 11 from both end portions of the casing 11 in the direction of the center axis O. The rotary shaft 20 is rotatably supported with respect to the casing 11 around the center axis O by bearing portions 13 at both end portions protruding outward from a the casing 11. Each bearing portion 13 includes journal bearings 14 respectively provided at both end portions of the rotary shaft 20 and a thrust bearing 15 which is provided on one end side of the rotary shaft 20.

The moving blade ring 30 is held by the rotary shaft 20 and a plurality of moving blade rings 30 are provided at intervals along the direction of the center axis O of the rotary shaft 20. The moving blade rings 30 and the stationary blade rings 12 are alternately disposed along the center axis O. Each moving blade ring 30 is formed to extend radially outward from an outer peripheral surface of the rotary shaft 20. In each moving blade ring 30, a plurality of moving blades 30w are disposed at intervals in the circumferential direction.

The boiler 40 generates high-temperature and high-pressure steam S, and supplies the steam S to the steam turbine 10 via the steam flow path 41.

In addition, this steam 10 is a so-called high-pressure turbine. In addition, although not shown, an intermediate-pressure turbine and a low-pressure turbine are connected to this high-pressure turbine, a condenser is connected to the high-pressure turbine, water is supplied from the condenser to the boiler 40, and the steam S is generated by the boiler 40 again.

Figure 2:
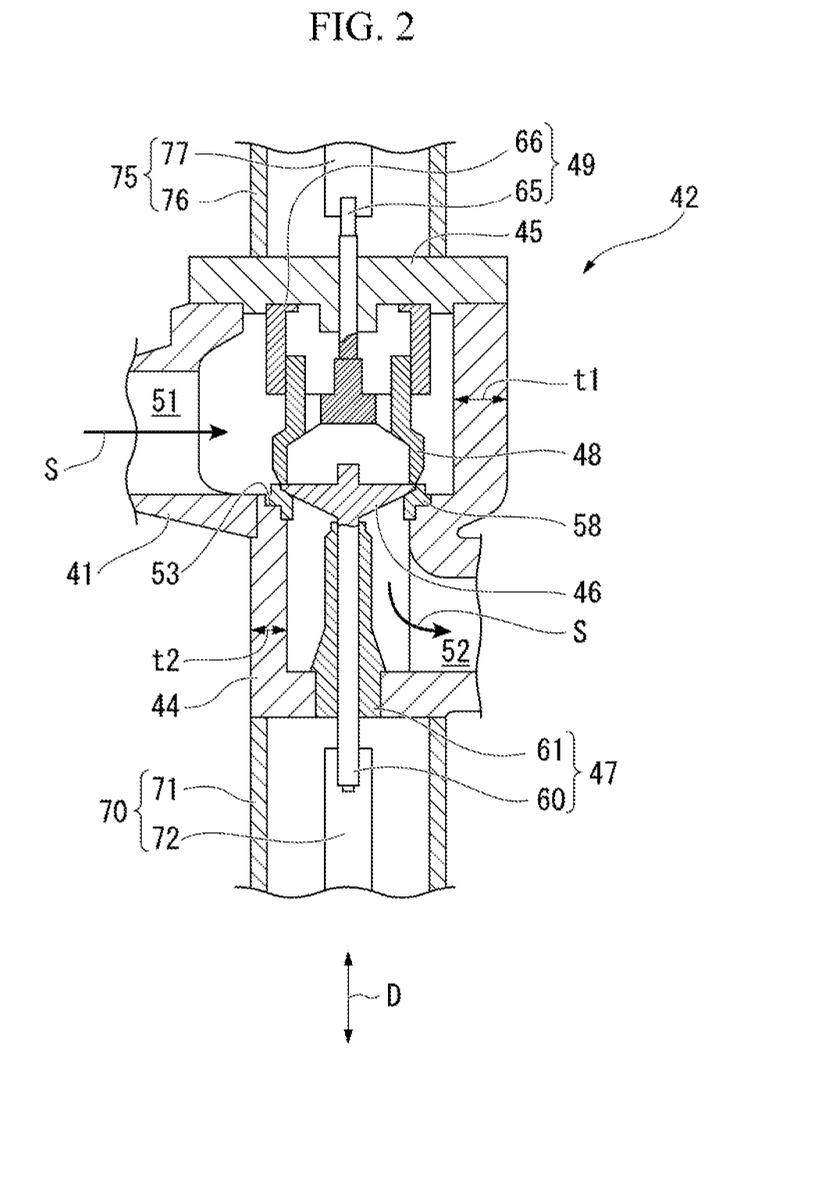
FIG. 2 is a longitudinal sectional view of an on-off valve of the steam according to the first embodiment of the present invention.

Next, the on-off valve 42 will be described with reference to FIG. 2.

The on-off valve 42 includes a valve box 44, a stop valve body (valve body) 46 which is operated in the valve box 44, a stop valve supporting portion (valve support portion) 47 which supports the stop valve body 46, an adjustable valve body 48 which is disposed to face the stop valve body 46, and an adjustable valve support portion 49 which supports the adjustable valve body 48. In addition, the on-off valve 42 further includes a first actuator 70 which drives the stop valve supporting portion 47 and a second actuator 75 which drives the adjustable valve support portion 49.

In the valve box 44, an inlet flow path 51 which is connected to the steam flow path 41 and an outlet flow path 52 which communicates with the inlet flow path 51. In addition, the steam S flows in from the inlet flow path 51 and flows out from the outlet flow path 52.

The inlet flow path 51 is connected to the steam flow path 41. In addition, in the valve box 44, a lid portion 45 which is attached and detached so as to open and close the inlet flow path 51 is provided.

The outlet flow path 52 straightly extends along an opening direction D of the communication hole 53 from the communication hole 53 which is a connection portion between the inlet flow path 51 and the outlet flow path 52 on a downstream side of the inlet flow path 51 in a flow of the steam S, and thereafter, the outlet flow path 52 is curved such that the extension direction thereof is bent by 90° and straightly extends toward a downstream side in the flow of the steam S. That is, the outlet flow path 52 extends in a direction (an orthogonal direction in the present embodiment) intersecting the opening direction D of the communication hole 53. An annular valve seat 58 is provided on the communication hole 53.

The stop valve body 46 is operated in the opening direction D of the communication hole 53 to open and close the communication hole 53. That is, the stop valve body 46 is operated to approach the valve seat 58 so as to come into contact with the valve seat 58, or is operated to be separated from the valve seat 58 so as to not come into contact with the valve seat 58. This enables the steam S to flow between the inlet flow path 51 and the outlet flow path 52 or blocks the flow of the steam S.

The stop valve supporting portion 47 includes a valve rod 60 which supports the stop valve body 46 straightly extending along the opening direction D of the communication hole 53, and a sheath 61 into which the valve rod 60 is inserted and which supports the valve rod 60 such that the valve rod 60 slidably moves in the opening direction D. The sheath 61 straightly extends in the opening direction D, penetrates the valve box 44, and is supported by the valve box 44. The sheath 61 extends to a position approaching the stop valve body 46 and a portion of the sheath 61 is disposed in the outlet flow path 52.

Here, in the present embodiment, a minimum wall thickness t2 of the valve box 11 which is positioned on the outlet flow path 52 side (downstream side) from the communication hole 53 and is positioned on a side opposite to a side to which the outlet flow path 52 extends across the sheath 61 is smaller than a minimum wall thickness t1 of the valve box 44 on the inlet flow path 51 side (upstream side) from the communication hole 53.

The adjustable valve body 48 is disposed in the inlet flow path 51 and faces the stop valve body 46 in the opening direction D. In addition, the adjustable valve body 48 is operated to approach the valve seat 58 so as to come into contact with the valve seat 58 and is operated to be separated so as not to come into contact with the valve seat 58. When the adjustable valve body 48 comes into contact with the valve seat 58, the adjustable valve body 48 comes into contact with an outer end of the stop valve body 46. That is, an end portion of the adjustable valve body 48 on the communication hole 53 side is formed in a cylindrical shape.

The adjustable valve support portion 49 has a cylindrical sleeve 66 which is fixed to an inner surface of the valve box 44 facing the communication hole 53 in the opening direction D and supports the adjustable valve body 48 and a valve rod 65 which is disposed inside the sleeve 66, straightly extends along the opening directions D, and supports the adjustable valve body 48. The valve rod 65 straightly extends in the opening direction D and penetrates the valve box 44.

The first actuator 70 includes a casing 71 which is fixed to the valve box 44 on the outlet flow path 52 side in the valve box 11 and a push rod 72 which supports the valve rod 60 and moves the valve rod 60 forward or rearward. The casing 71 is disposed on an extension line of an axis of the valve rod 60 supporting the stop valve body 46 and is fixed to an outer surface of the valve box 44.

The second actuator 75 includes a casing 76 which is fixed to the valve box 44 on the inlet flow path 51 side in the valve box 44 and a push rod 77 which supports the valve rod 65 and moves the valve rod 65 forward or rearward. The casing 76 is disposed on an extension line of an axis of the valve rod 65 supporting the adjustable valve body 48 and is fixed to the outer surface of the valve box 44.

The steam turbine 10 of the above-described present embodiment includes the on-off valve 42 having the above-described configuration.

Figure 3:
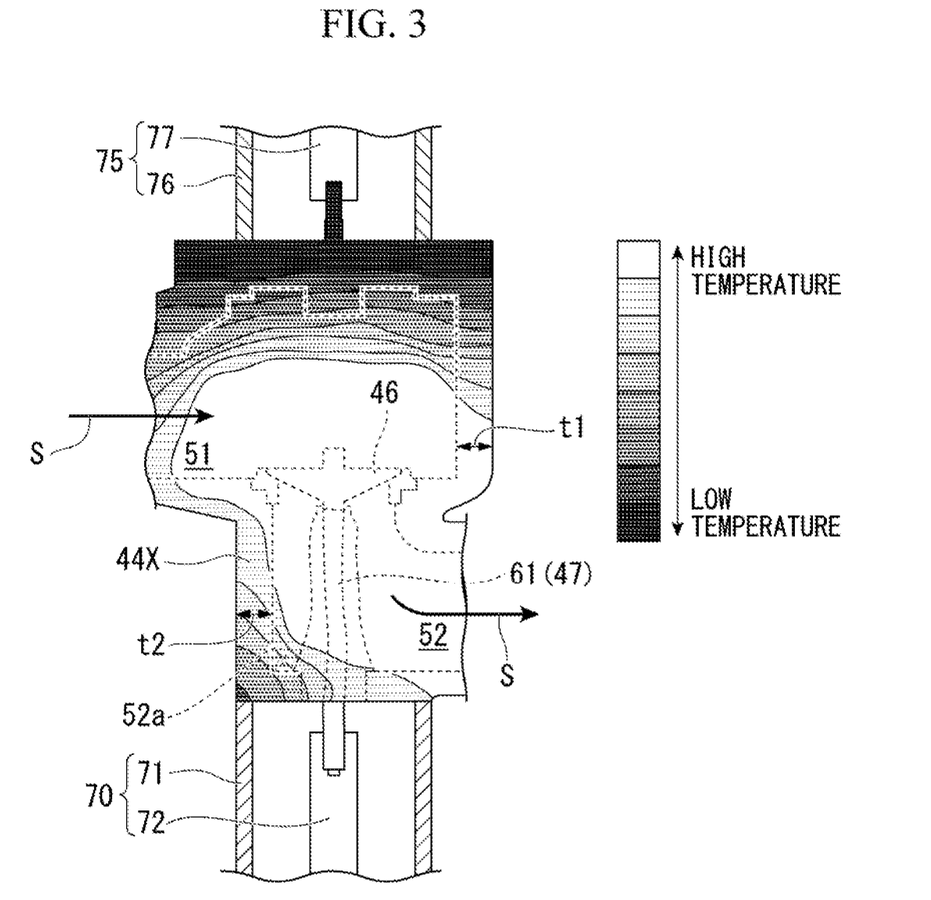
FIG. 3 is a longitudinal sectional view of an on-off valve in the related art and shows an analysis result showing a temperature distribution of a valve box.

Here, as shown in an analysis result of FIG. 3, the flow of the steam S stagnates around the sheath 61 of the stop valve supporting portion 47 in the outlet flow path 52, and thus, a heat transfer coefficient between the steam S and the valve box 44X is lower than those of other portions of the valve box 44X. For example, in a valve box 44X shown in FIG. 3, the minimum wall thickness t1=t2.

More specifically, the flow of the steam S stagnates at a portion opposite to a side (right side on a paper surface of the FIG. 3) to which the outlet flow path 52 extends across the sheath 61, that is, a corner portion 52a at which the outlet flow path 52 is bent. Accordingly, the heat transfer coefficient between the steam S and the valve box 44X decreases at the corner portion 52a. As a result, a temperature of the valve box 44X at the corner portion 52a is lower than those of other portions of the valve box 44X.

Accordingly, as shown in FIG. 3, compared with the side to which the outlet flow path 52 extends across the sheath 61, an amount of thermal deformation (amount of thermal expansion) of an outer surface of the sheath 61 on the side opposite to the extension side of the outlet flow path 52 is small, and thus, the sheath 61 and the valve rod 60 are bent as a whole. As a result, it is difficult to smoothly operate the stop valve body 46.

Here, in the present embodiment, the minimum wall thickness t2 of the valve box 44 on the side opposite to the side to which the outlet flow path 52 extends across the sheath 61 on the outlet flow path 52 side is smaller than the minimum valve thickness t1 of the valve box 14 on the inlet flow path 51 side. As a result, in the corner portion 52a which is the position at which a direction of the outlet flow path 52 is changed and in the position at which the flow of the steam S stagnates around the sheath 61, the thickness of the valve box 44 can decrease.

Accordingly, for example, particularly, in a case where the temperature of the valve box 44 is changed suddenly at a start-up of the steam turbine 10, or the like, heat conduction on the wall surface of the valve box 44 can be promoted at the position at which the flow of the steam S stagnates, and thus, it is possible to decrease a temperature gradient of the wall surface. Accordingly, a temperature can be uniformly increased in the valve box 44 by the steam S on the outlet flow path 52 side, and the thermal deformation of the valve box 44 around the sheath 61 can be uniformized. Accordingly, uneven thermal deformation of the valve box 44 is suppressed, and bending deformation of the valve rod 60 and the sheath 61 as shown in FIG. 3 can be suppressed. As a result, it is possible to smoothly open or close the stop valve body 45 while suppressing occurrence of thermal stress of the valve rod 60 or the like.

Second Embodiment

Figure 4A:
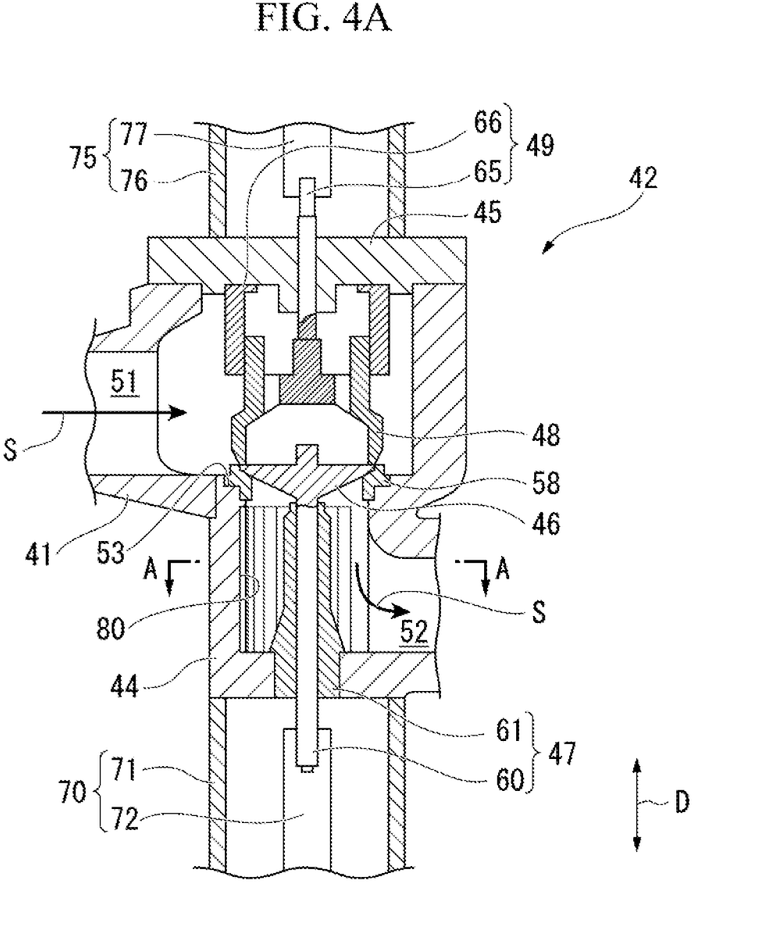
FIG. 4A is a longitudinal sectional view of an on-off valve of a steam turbine according to a second embodiment of the present invention.

Next, a second embodiment of the steam turbine 10 according to the present invention will be described. In addition, in the second embodiment described below, in the drawings, the same reference signs are assigned to the same configurations as those of the first embodiment, and repeated descriptions are omitted. The second embodiment is different from the first embodiment in that an uneven portion 80 is provided on an inner surface of a valve box 44A.

Figure 4B:
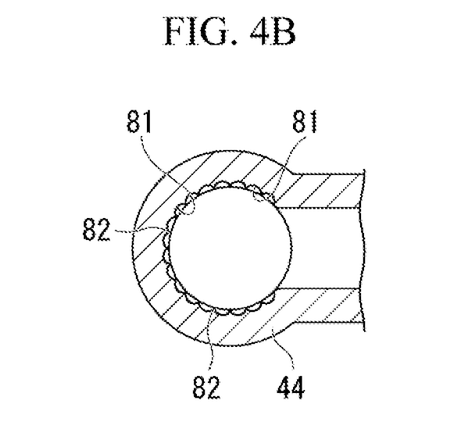
FIG. 4B is a sectional view taken along line A-A of FIG. 4A in the on-off valve of the steam turbine according to the second embodiment of the present invention.

As shown in FIG. 4A, the uneven portion 80 is provided on an inner surface of the valve box 44A forming the outlet flow path 52 on the side opposite to the side to which the outlet flow path 52. More specifically, the uneven portion 80 has a plurality of concave portions 81 which extends along the sheath 61 and the valve rod 60, are arranged to be adjacent to each other in the circumferential direction of the valve rod 60, and are recessed from the inner surface of the valve box 44A, and fin-shaped convex portions 82 which protrude to the outlet flow path 52 between the concave portions 81 adjacent to each other in the circumferential direction. Accordingly, the uneven portion 80 is provided to surround the sheath 61 from the outer periphery. As shown in FIG. 4B, for example, a cross sectional shape, of each concave portion 81 when the concave portion 81 is viewed in the opening direction D may be a semicircular shape, and when viewed in the opening direction D, the plurality of concave portions 81 may form a waveform.

Figure 5:
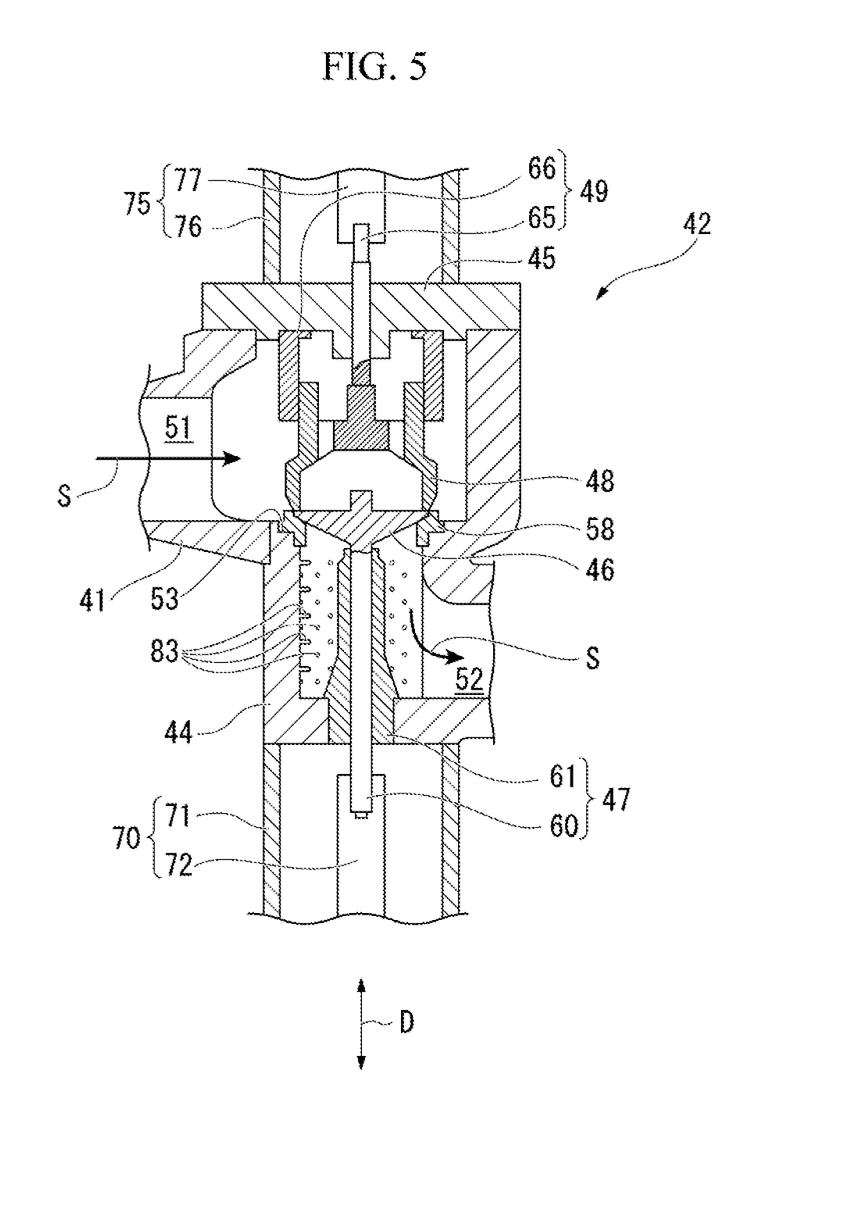
FIG. 5 is a longitudinal sectional view of an on-off valve of a steam turbine according to a modification example of the second embodiment of the present invention.

In addition, as shown in FIG. 5, the uneven portion 80 may have cylindrical fins 83 protruding from the inner surface of the valve box 44A. Instead of the cylindrical fins 83, pin fins may be used. In addition, the uneven portion 80 may simply be a rough surface having a rough inner surface of the valve box 44A.

In a case where the valve box 44A is formed by casting, the uneven portion 80 may be formed on the inner surface of the valve box 44A by forming a shape corresponding to the uneven portion 80 in a mold. In addition, after the valve box 44A is manufactured, the uneven portion 80 may be formed by machining.

According to the steam turbine 10 of the above-described present embodiment, a heat transfer area at the position at which the flow of the steam S stagnates is increased by the uneven portion 80 provided in the valve box 44A, and thus, it is possible to disturb the flow of the steam S. Therefore, the heat transfer at the position at which the uneven portion 80 is provided can be promoted, and the temperature of the valve box 44A at the position at which the steam S stagnates around the sheath 61 can be close to temperatures of other portions of the valve box 44A. As a result, it is possible to further decrease the temperature gradient of the wall surface of the valve box 44A at the position at which the steam S stagnates.

Accordingly, it is possible to decrease the temperature gradient of the wall surface of the valve box 44A on the side opposite to the side to which the outlet flow path 52 extends. Therefore, it is possible to smoothly open and close the stop valve body 45 by suppressing the uneven thermal deformation of the valve box 44A.

Third Embodiment

Figure 6A:
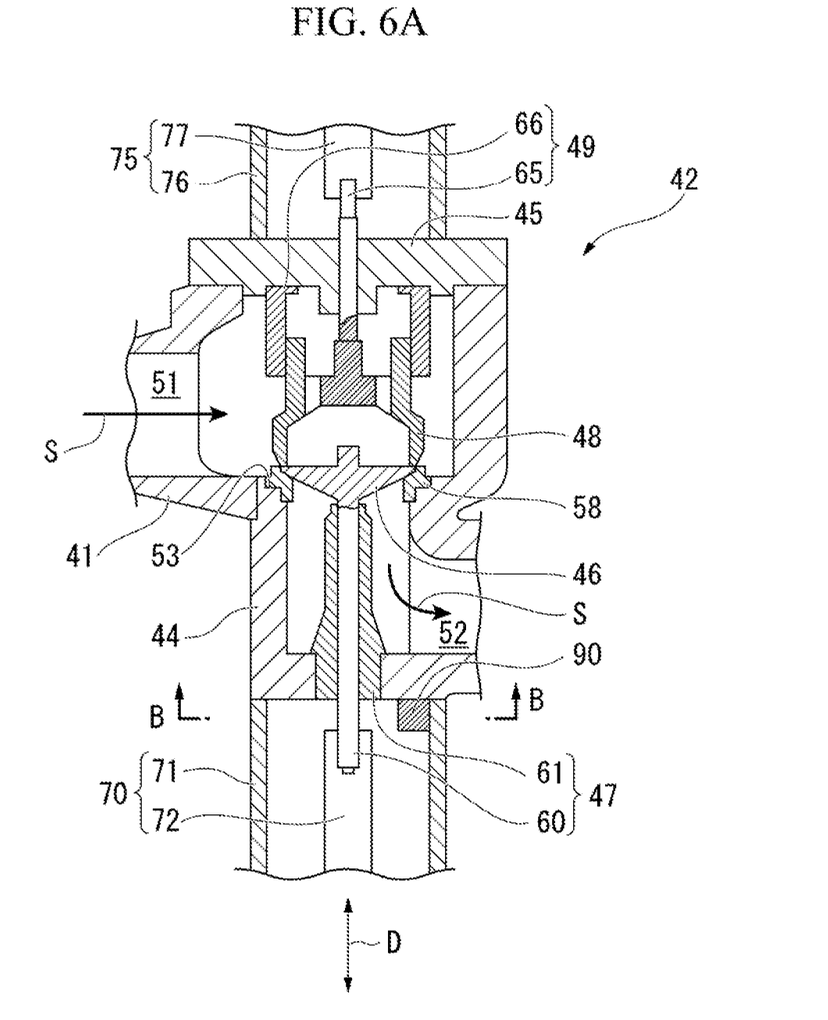
FIG. 6A is a longitudinal sectional view of an on-off valve of a steam turbine according to a third embodiment of the present invention.

Next, a third second embodiment of the steam turbine 10 according to the present invention will be described. In addition, in the third embodiment described below, in the drawings, the same reference signs are assigned to the same configurations as those of the first embodiment and the second embodiment, and repeated descriptions are omitted. The third embodiment is different from the first embodiment and the second embodiment in that a metal member 90 fixed to the outer surface of the valve box 11 is further provided.

Figure 6B:
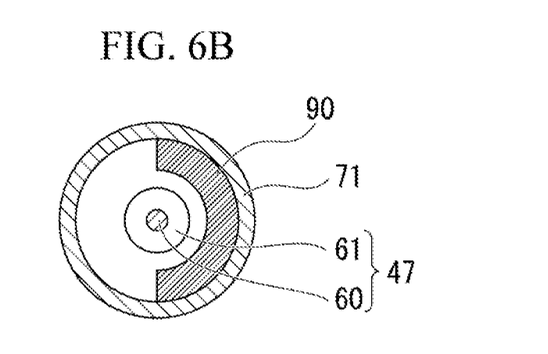
FIG. 6B is a sectional view taken along line B-B of FIG. 6A in the on-off valve of the steam turbine according to the third embodiment of the present invention.

As shown in FIG. 6A, the metal member 90 is positioned on the outlet flow path 52 side from the communication hole 53 and is fixed to the outer surface of the valve box 11 only on a side to which the outlet flow path 52 extends across the sheath 61. Moreover, the metal member 90 is formed of a metal material having a large heat capacity such as carbon steel or stainless steel, and, for example, as shown in FIG. 6B, is disposed coaxially with the valve rod 60 and has a semi-annular shape when viewed in the opening direction D.

In the present embodiment, the metal member 90 is provided inside the casing 71 of the first actuator 70, the first actuator 70 is fixed to the valve box 44, and thus, the metal member 90 is indirectly fixed to the valve box 44.

In addition, the metal member 90 is not provided inside the casing 71 of the first actuator 70, and may be directly fixed to the outer surface of the valve box 44. Moreover, the metal member 90 may not be formed in a semi-annular shape, and may have any shape as long as it is provided only on the side to which the outlet flow path 52 extends across the sheath 61. For example, the metal member 90 is divided, and thus, a plurality of metal members 90 may be provided.

Here, the metal members 90 may be provided on both sides of the side opposite to the side to which the outlet flow path 52 extends across the sheath 61 and the side to which the outlet flow path 52 extends. An installation position of the metal member 90 may be appropriately changed depending on conditions such as whether to suppress the deformation during start-up or whether to suppress the deformation during a rated operation.

According to the steam turbine 10 of the above-described the present embodiment, by the metal member 90, heat from the wall surface of the valve box 44 can flow into the metal member 90 on the side to which the outlet flow path 52 extends. That is, the metal member 90 can function as a heat storage unit. Accordingly, compared with the side on which the flow of the steam S stagnates in the vicinity of the sheath 61 becoming the side opposite to the side to which the outlet flow path 52 extends, heat dissipation can be promoted on the side to which the outlet flow path 52 extends, and thus, thermal deformation of the valve box 44 around the sheath 61 can be uniformized.

Accordingly, it is possible to decrease the temperature gradient of the wall surface of the valve box 44 on the side opposite to the side to which the outlet flow path extends. Therefore, it is possible to smoothly open and close the valve body by suppressing the uneven thermal deformation of the valve box 44.

Fourth Embodiment

Figure 7A:
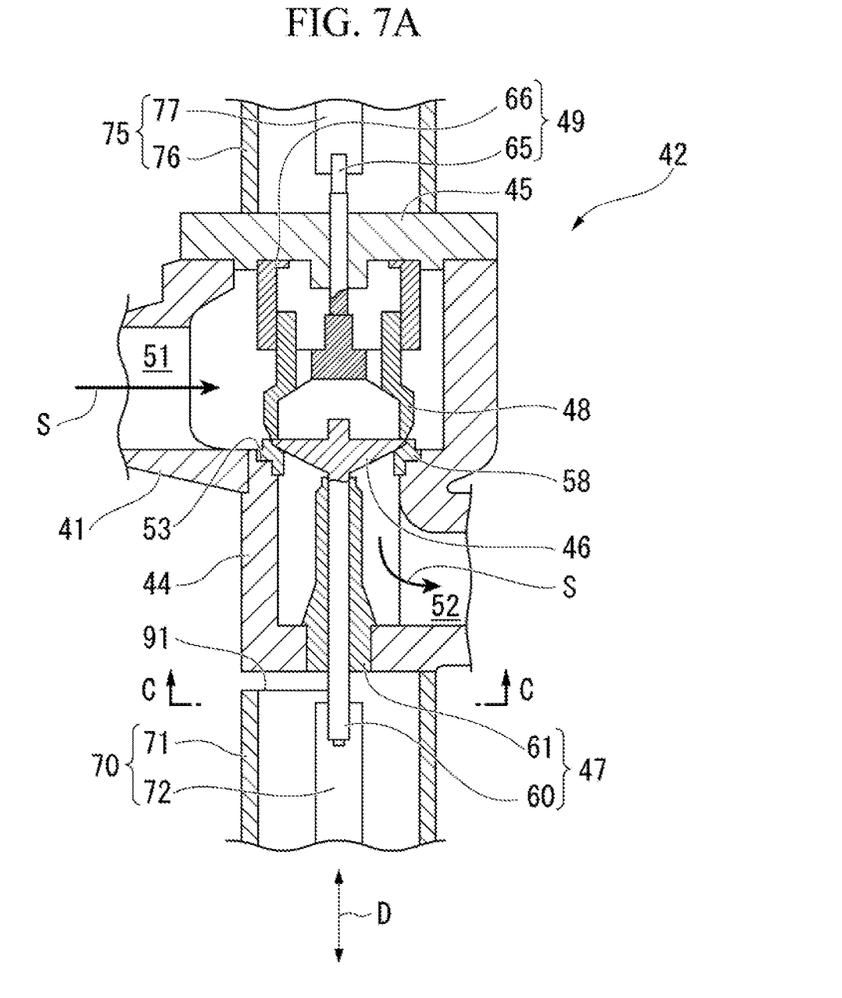
FIG. 7A is a longitudinal sectional view of an on-off valve of a steam turbine according to a fourth embodiment of the present invention.

Next, a fourth embodiment of the steam turbine 10 according to the present invention will be described. In addition, in the fourth embodiment described below, in the drawings, the same reference signs are assigned to the same configurations as those of the first embodiment to the third embodiment, and repeated descriptions are omitted. The fourth embodiment is different from the first embodiment to the third embodiment in that a gap 91 is provided between the first actuator 70 and the valve box 11 on the side opposite to the side to which the outlet flow path 52 extends across the sheath 61.

Figure 7B:
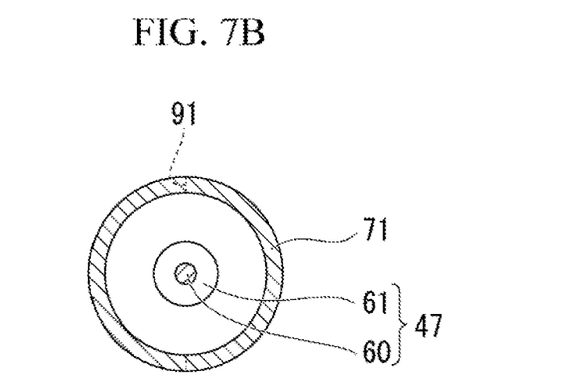
FIG. 7B is a sectional view taken along line C-C of FIG. 7A in the on-off valve of the steam turbine according to the fourth embodiment of the present invention.

That is, as shown in FIGS. 7A and 7B, a gap 91 which is disposed coaxially with the valve rod 60 and has a semi-annular shape is formed between the casing 71 of the first actuator 70 and the valve box 44 on the side opposite to the side to which the outlet flow path 52 extends across the sheath 61.

In addition, the gap 91 may be not formed a semi-annular shape and may have any shape as long as at least it is provided on the side to which the outlet flow path 52 extends across the sheath 61. For example, the gap 91 may be divided ire the circumferential direction of the valve rod 60, and a plurality of gaps 91 may be provided.

Here, the gaps 91 may be provided on both sides of the side opposite to which the outlet flow path 52 extends across the sheath 61 and the side to which the outlet flow path 52 extends such that a size of the gap 91 on the side opposite to the side to which the outlet flow path 52 extends is larger than a size of the gap 91 on the side to which the outlet flow path 52 extends.

According to the steam turbine 10 of the above-described present embodiment, the gap 91 is provided between the casing 71 of the first actuator 70 and the valve box 44 on the side opposite to the side to which the outlet flow path 52 extends across the sheath 61, and thus, at this position, it is possible to suppress heat dissipation caused by heat conduction from the valve box 11 to the first actuator 70.

In addition, the gap 91 is not provided between the valve box 11 and the casing 71 on the side to which the outlet flow path 52 extends, that is, the valve box 44 and the casing 71 come into close contact with each other, and thus, the heat dissipation from the valve box 14 to the casing 71 is easily performed. Accordingly, thermal deformation of the valve box 44 around the sheath 61 can be uniformized on both sides of the sheath 61.

Accordingly, it is possible to decrease the temperature gradient of the wall surface of the valve box 44 on the side opposite to the side to which the outlet flow path 52 extends. Therefore, it is possible to smoothly open and close the valve body by suppressing the uneven thermal deformation of the valve box 14.

Hereinbefore, the embodiments of the present invention are described in detail with reference to the drawings. However, the respective configurations and the combinations thereof and the like in the respective embodiments are merely examples, and additions, omissions, replacements, and other modifications of configurations are possible within a scope which does not depart from the gist of the present invention. In addition, the present invention is not limited by the embodiments, and is limited only by claims.

For example, in the above-described embodiments, the on-off valve 42 including the stop valve body 46 and the adjustable valve body 48 is described. However, the on-off valve 42 which does not have the adjustable valve body 48 may be provided.

In addition, the outlet flow path 52 is not limited to the above-described configurations as long as it extends in the direction intersecting the opening direction D of the communication hole 53 and the valve rod 60 is provided at the position (corner portion 52a) at which the extension direction is changed. That is, the outlet flow path 52 may straightly extend from the communication hole 53, and thereafter, the outlet flow path 52 may be bent smoothly such that the extension direction is changed in the middle. The outlet flow path 52 may be bent abruptly to extend to a downstream side of the flow of the steam S.

In addition, the metal member 90 of the third embodiment and the gap 91 of the fourth embodiment may be provided together. In addition, the metal member 90 of the third embodiment and the gap 91 of the fourth embodiment may be applied to the on-off valve which has the configurations of the first embodiment and the second embodiment, or may be applied to the on-off valve which does not have the configurations of the first embodiment and the second embodiment.

INDUSTRIAL APPLICABILITY

According to the present invention, it is possible to smoothly open and close a valve body by suppressing uneven thermal deformation of a valve box.

REFERENCE SIGNS LIST

10: steam turbine
11: casing
12: stationary blade ring
12w: stationary blade
13: bearing portion
14: journal bearing
15: thrust bearing
20: rotary shaft
30: moving blade ring
30w: moving blade
40: boiler
41: steam flow path
42: on-off valve
44, 44A, 44X: valve box
45: lid portion
46: stop valve body (valve body)
47: stop valve supporting portion (valve support portion)
48: adjustable valve body
49: adjustable valve support portion
51: inlet flow path
52: outlet flow path
52a: corner portion
53: communication hole
58: valve seat
60: valve rod
61: sheath
65: valve rod
66: sleeve
70: first actuator (drive unit)
71: casing
72: push rod
75: second actuator
76: casing
77: push rod
80: uneven portion
81: concave portion
82: convex portion
83 cylindrical fin
90: metal member
91: gap
O: center axis
S: steam
D: opening direction

The invention claimed is:

1. An on-off valve comprising:
a valve box which includes an inlet flow path of steam, and an outlet flow path which communicates with the inlet flow path through a communication hole on a downstream side in a flow direction of the steam;
a valve body which is configured to open or close the communication hole; and
a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole,
wherein in an inner surface of the valve box forming the outlet flow path, an uneven portion is provided on an inner surface around the valve support portion,
wherein the outlet flow path extends in a direction intersecting the opening direction of the communication hole toward a downstream side, and
wherein a minimum wall thickness of the valve box on a side, which is positioned on a downstream side from the communication hole and is opposite to a side to which the outlet flow path extends across the valve support portion, is smaller than a minimum wall thickness of the valve box on an upstream side from the communication hole.

2. The on-off valve according to claim 1, further comprising:
a metal member which is fixed to an outer surface of the valve box on the downstream side from the communication hole.

3. The on-off valve according to claim 1, further comprising:
a drive unit which is fixed to the valve box on the downstream side from the communication hole and configured to drive the valve support portion,
wherein a gap is provided between the drive unit and the valve box on the side opposite to the side to which the outlet flow path extends across the valve support portion.

4. A steam turbine comprising:
a steam flow path; and
the on-off valve according to claim 1 provided in the steam flow path.

5. An on-off valve comprising:
a valve box which includes an inlet flow path of steam, and an outlet flow path which communicates with the inlet flow path through a communication hole on a downstream side in a flow direction of the steam;
a valve body which is configured to open or close the communication hole;
a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole; and
a metal member which is fixed to an outer surface of the valve box on a downstream side from the communication hole and on a side to which the outlet flow path extends across the valve support portion,
wherein the outlet flow path extends in a direction intersecting the opening direction of the communication hole toward a downstream side.

6. A steam turbine comprising:
a steam flow path; and
the on-off valve according to claim 5 provided in the steam flow path.

7. An on-off valve comprising:
a valve box which includes an inlet flow path of steam, and an outlet flow path which communicates with the inlet flow path through a communication hole on a downstream side in a flow direction of the steam;
a valve body which is configured to open or close the communication hole;
a valve support portion which penetrates the valve box such that a portion of the valve support portion is disposed in the outlet flow path, is supported by the valve box on the outlet flow path side from the communication hole, and supports the valve body so as to be capable of operating the valve body in an opening direction of the communication hole;
a metal member which is fixed to an outer surface of the valve box on a downstream side from the communication hole and on a side to which the outlet flow path extends across the valve support portion; and
a drive unit which is fixed to the valve box on the downstream side from the communication hole and configured to drive the valve support portion,
wherein the outlet flow path extends in a direction intersecting the opening direction of the communication hole toward the downstream side, and
wherein a gap is provided between the drive unit and the valve box on a side opposite to a side to which the outlet flow path extends across the valve support portion.

8. A steam turbine comprising:
a steam flow path; and
the on-off valve according to claim 7 provided in the steam flow path.

* * * * *